United States Patent

Niwa et al.

[11] Patent Number: 4,500,710
[45] Date of Patent: Feb. 19, 1985

[54] QUINOPHTHALONE DYES FOR CELLULOSE-CONTAINING FIBERS

[75] Inventors: Toshio Niwa; Toshio Hihara, both of Kanagawa, Japan

[73] Assignee: Mitsubishi Chemical Industries, Limited, Tokyo, Japan

[21] Appl. No.: 505,127

[22] Filed: Jun. 16, 1983

[51] Int. Cl.³ .................. C07D 401/10; C07D 401/14
[52] U.S. Cl. ..................................... 544/113; 544/212
[58] Field of Search ................................ 544/212, 113

[56] References Cited

U.S. PATENT DOCUMENTS 3,983,117  9/1976  Scheuermann et al. ............ 544/212

Primary Examiner—John M. Ford
Attorney, Agent, or Firm—Sughrue, Mion, Zinn, Macpeak and Seas

[57] ABSTRACT

Quinophthalone dyes for cellulose-containing fibers represented by the following general formula:

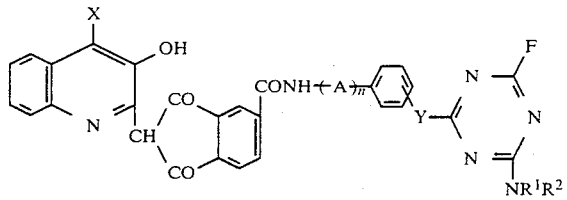

wherein X represents a hydrogen atom, a chlorine atom or a bromine atom, —A— represents a methylene group, an ethylene group, a propylene group or a 1,3-butylene group, n represents 0 or 1, —Y— represents a linkage group of —O— or —S—, $R^1$ and $R^2$ each represents a hydrogen atom, an alkyl or alkenyl group which may optionally be substituted with a cyano group, a hydroxy group, a lower alkoxy group or by a dialkylamino group, or $R^1$ and $R^2$ may be combined together with the adjacent nitrogen atom to form a 5- or 6-membered, nitrogen-containing heterocyclic ring having the total carbon atom number in $R^1$ and $R^2$ of up to 18.

3 Claims, No Drawings

QUINOPHTHALONE DYES FOR CELLULOSE-CONTAINING FIBERS

FIELD OF THE INVENTION

This invention relates to quinophthalone dyes for dyeing cellulose-containing fibers. More particularly, it relates to reactive quinophthalone dyes capable of dyeing cellulose-containing fibers, particularly cellulose fibers and fiber blend composed of cellulose fibers and polyester fibers, yellow with good fastness properties including light fastness.

SUMMARY OF THE INVENTION

The quinophthalone dyes of the present invention for dyeing cellulose-containing fibers are represented by the following general formula (I):

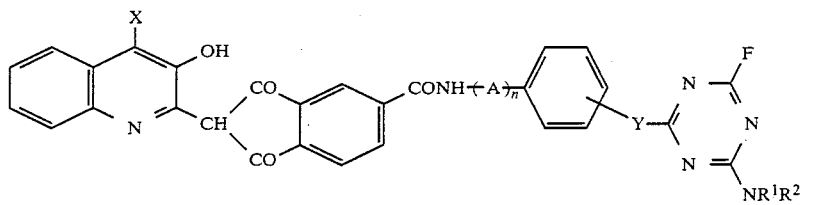

(I)

wherein X represents a hydrogen atom, a chlorine atom or a bromine atom, —A— represents a methylene group, an ethylene group, a propylene group or a 1,3-butylene group, n represents 0 or 1, —Y— represents a linkage group of —O— or —S—, $R^1$ and $R^2$ each represents a hydrogen atom, an alkyl or alkenyl group which may optionally be substituted with a cyano group, a hydroxy group, a lower alkoxy group or a dialkylamino group, or $R^1$ and $R^2$ may be combined together with the adjacent nitrogen atom to form a 5- or 6-membered, nitrogen-containing heterocyclic ring having a total carbon atom number in $R^1$ and $R^2$ of up to 18.

DETAILED DESCRIPTION OF THE INVENTION

The quinophthalone dyes represented by the general formula (I) can be readily produced by, for example, reacting a compound represented by the following general formula (II):

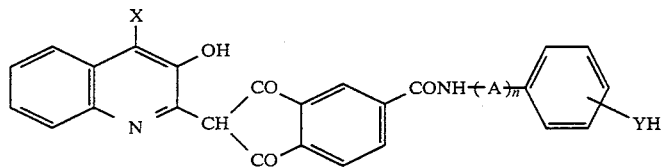

(II)

wherein X, Y, A and n are the same as defined hereinbefore, with a compound represented by the following general formula (III):

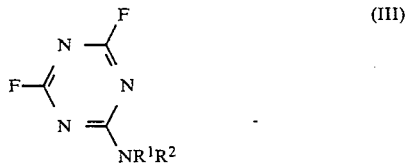

(III)

wherein $R^1$ and $R^2$ are the same as defined hereinbefore, in a solvent such as N-methyl-2-pyrrolidone.

Examples of the alkyl group represented by $R^1$ and $R^2$ in the general formula (III) include a methyl group, an ethyl group, and a straight or branched chain alkyl group containing 3 to 18 carbon atoms, and examples of the substituted alkyl group include alkyl groups substituted with a cyano group, a hydroxy group, a lower alkoxy group or a dialkylamino group, such as a cyanomethyl group, a 2-cyanoethyl group, a 3-cyanopropyl group, a 2-hydroxyethyl group, a 2-hydroxypropyl group, a 3-hydroxypropyl group, a 4-hydroxybutyl group, a 2-(2-hydroxyethoxy)ethyl group, a tris(hydroxymethyl)methyl group, a 2-ethoxyethyl group, a 3-isopropoxypropyl group, a 3-(2-methoxyethoxy)propyl group, a 2,2-diethoxyethyl group, a 2-(N,N-diethylamino)ethyl group, a 2-(N,N-dimethylamino)ethyl group, a 3-(N,N-dimethylamino)propyl group, etc.

Examples of the alkenyl group include an allyl group, a 2-methylallyl group, a 3-methylallyl group, a straight or branched chain alkenyl group containing 4 to 18 carbon atoms, and examples of the substituted alkenyl group include alkenyl groups substituted with a cyano group, a hydroxy group or a lower alkoxy group, such as a 3-cyanoallyl group, a 2-hydroxyallyl group, a 3-methoxyethoxyallyl group, a 1-methyl-3-(N,N-diethylamino)allyl group, etc.

Examples of the nitrogen-containing heterocyclic ring group represented by —$NR^1R^2$ include a 1-pyrrolidinyl group, a 3-methyl-1-pyrrolidinyl group, a 2-hydroxy-1-pyrrolidinyl group, a 2,5-dimethyl-1-pyrrolidinyl group, a 3-thiazolidinyl group, a 1-pyrrolyl group, a 1-pyrazolyl group, a 1-imidazolyl group, a morpholino group, a piperidino group, a 2,6-dimethylpiperidino group, a 1-piperazinyl group, a 4-methyl-1-piperazinyl group, etc. As the —$NR^1R^2$ group, disubstituted amino groups containing the total carbon atom of 6 to 12 carbon atoms are particularly preferred.

Dyes of the general formula (I) wherein X represents Cl or Br and n represents 0 have a particularly excellent light fastness.

In producing the quinophthalone dyes represented by the general formula (I), one mol of a quinophthalone compound represented by the general formula (II) is reacted with 1 to 1.2 mols of a difluorotriazine compound represented by the general formula (III) in an organic solvent such as acetone, methyl ethyl ketone, toluene, nitrobenzene, dioxane, N,N-dimethylformamide, N-methyl-2-pyrrolidone or dimethyl sulfoxide in the presence of 1 to 2 mols, per mol of the starting quinophthalone compound, of an acid-binding agent such as a tertiary amine (e.g., triethylamine, tributylamine, N,N-diethylaniline, etc.) or an inorganic base (e.g., potassium carbonate, potassium hydrogen-carbonate, etc.) by heating at 40° to 90° C. for 0.5 to 5 hours.

The thus-obtained reaction solution is cooled, and a precipitate formed by, for example, pouring the reaction solution into water, is separated by filtration, centrifugation or the like to obtain the quinophthalone dye represented by the general formula (I) almost quantitatively.

Examples of the cellulose-containing fibers dyeable with the dye of the present invention include natural fibers such as cotton and hemp, semi-synthetic fibers such as viscose rayon and cuprammonium rayon, and partially aminated or partially acylated modified cellulose fibers, and woven or knitted fabrics and unwoven fabrics of these fibers. Furthermore, blended or mixed fibers of the above-described fibers with other fibers such as polyester fibers, cation-dyeable polyester fibers, anion-dyeable polyester fibers, polyamide fibers, wool, acrylic fibers, urethane fibers, di- or triacetate fibers, etc., can be used. Of these, cellulose fibers and blended or mixed fibers of cellulose fibers with polyester fibers are particularly effectively dyeable with the dyes in accordance with the present invention.

In practicing dyeing, the dye represented by the general formula (I) is desirably dispersed with a fine particle size of about 0.5 to 2$\mu$ in a medium. The fine dispersion of the dye is effected by, for example, using a grinder such as a sand grinder or a mill to finely disperse the dye in water with the aid of a water-soluble dispersing agent such as a nonionic, for example, Pluronic, surfactant or an anionic dispersing agent (e.g., sodium ligninsulfonate or sodium salt of naphthalenesulfonic acid-formaldehyde condensate), by finely dispersing the dye in other solvent than water such as an alcohol (e.g., ethyl alcohol, isopropyl alcohol, polyethylene glycol, etc.), a ketone (e.g., acetone, methyl ethyl ketone, etc.), a hydrocarbon (e.g., n-hexane, toluene, xylene, mineral turpentine, etc.), a halogenated hydrocarbon (e.g., tetrachloroethylene), an ester (e.g., ethyl acetate, butyl acetate, etc.), an ether (e.g., dioxane, tetraethylene glycol dimethyl ether, etc.), or the mixture thereof using a slighly water-soluble or water-insoluble dispersing agent such as an adduct of sulfosuccinic ester or nonylphenol and some mols of ethylene oxide, or by finely dispersing the dye in a mixture system composed of water and a solvent freely miscible with water and selected from the above-described solvents.

Furthermore, in the above-described finely dispersing step, a high molecular weight compound soluble in each dispersion medium or a surfactant exerting mainly other actions than dispersing action may be added.

This fine dispersion of the dye may be used as such as a pad bath for the padding method or as a printing paste for the printing method. Usually, however, it is diluted to use, to a desired degree depending upon intended dyeing density, with water or a mixture of a freely water-miscible solvent and water or diluted into an o/w emulsion or w/o emulsion wherein a petroleum hydrocarbon such as mineral turpentine or a halogenated hydrocarbon such as tetrachloroethylene forms an oil phase.

In preparing a pad bath or a printing color paste, a cellulose fiber-swelling agent may be added for advantageously practicing the present invention, and an acid-binding agent such as an alkali metal compound, an epoxy compound or an organic vinyl compound may be added for accelerating the reaction between the dye and cellulose fibers. As the alkali metal compound, alkali metal bicarbonates, alkali metal phosphates, alkali metal borates, alkali metal silicates, alkali metal hydroxides, alkali metal fatty acid salts (e.g., alkali metal acetates), and alkali precursor compounds capable of producing alkali by heating such as sodium trichloroacetate and sodium acetoacetate can be used as well as alkali metal carbonates. These compounds are usually added in amounts such that the resulting pad bath or printing color paste has a pH of 7.5 to 8.5.

The organic epoxy compound includes ethylene glycol diglycidyl ether, polyethylene glycol diglycidyl ether having a mean molecular weight of 150 to 400, etc., and the organic vinyl compound includes ethylene glycol diacrylate, polyethylene glycol diacrylate or dimethacrylate having a mean molecular weight of 150 to 400, etc. These compounds are added in amounts of 3 to 6 wt% based on the pad bath or the printing color paste.

In addition, for the purpose of preventing dry migration upon padding dyeing or for adjusting the viscosity of a color paste to an optimal degree in a particular printing, a thickening agent such as a water-soluble high polymer (e.g., sodium alginate) may be added.

Preparation of the pad bath or the printing color paste is not limited only to that described above. Presence of the cellulose-swelling agent in the pad bath or the printing color paste is not always necessary, and the agent may be previously allowed to exist on fibers.

As the cellulose fiber-swelling agent, any agent which has a boiling point of 150° C. or above and can swell cellulose fibers can be used. Examples thereof include ureas such as N,N,N',N'-tetramethylurea; and polyhydric alcohols such as polyethylene glycol and polypropylene glycol, and the derivatives thereof. In particular, derivatives of polyhydric alcohol (e.g., polyethylene glycol or polypropylene glycol) having a mean molecular weight of about 200 to 500 and having both terminal hydroxy groups dimethylated or diacetylated (therefore, not reacting with the reactive group of the dye) are preferred as cellulose fiber-swelling agents.

The swelling agent is suitably used in an amount of about 5 to 25 wt%, preferably 8 to 15 wt%, based on the weight of the pad bath or the printing color paste.

Dyeing of the fibers with the dye of the present invention represented by the general formula (I) is effected in a conventional manner, for example, by impregnating or printing a cellulose fiber-containing substrate in a pad bath or with a printing color paste and, after drying, subjecting it to a heat treatment with a 160° to 220° C. hot air or superheated vapor for 30 seconds to 10 minutes or to a heat treatment in 120° to 150° C. high pressure saturated steam for 3 minutes to 30 minutes, and washing with a surfactant-containing hot water or with an o/w or w/o emulsion washing bath wherein a halogenated hydrocarbon such as tetrachloroethylene forms an oil phase or in an ordinary dry-cleaning manner.

The above-described process provides products dyed distinctly and uniformly with good light fastness and wet fastness.

The present invention will now be described in more detail by the following Examples of preferred embodiments of the present invention. However, the present invention is not to be limited thereto. All percents, parts, ratios and the like are by weight.

EXAMPLE 1

A dye composition comprising 15 parts of a quinophthalone dye represented by the following structural formula:

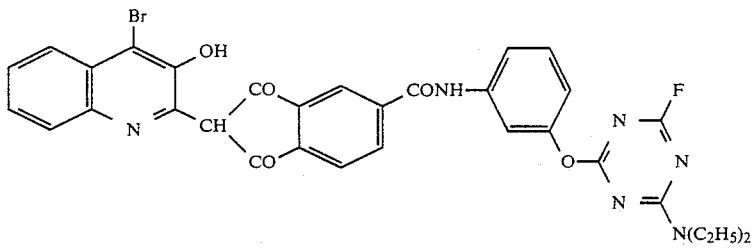

15 parts of a naphthalenesulfonic acid-formaldehyde condensate, and 70 parts of water was converted to a dye dispersion using a paint shaker as a finely dispersing machine.

A printing color paste was prepared according to the following formulation:

|  | parts |
|---|---|
| Dye dispersion | 6.5 |
| 5% Sodium alginate aqueous solution | 55 |
| Polyethylene glycol dimethyl ether (mean molecular weight: 400) | 9 |
| Water | 29.5 |
|  | 100 (pH 8.0) |

The resulting color paste was applied to a polyester-cotton blended fabric (blending ratio: 65/35) using a screen printing machine, dried at 80° C. for 3 minutes, then dry-heated at 215° C. for 90 seconds to fix. After washing with water, the fabric was subjected to soaping using a washing solution containing 2 g/liter of a nonionic surfactant (trade name: Scourol #900; made by Kao Soap Co., Ltd.) for 20 minutes at 80° C. with a bath ratio of 1:30 to obtain a yellow-dyed product with excellent light fastness and wet fastness.

The dye used in this Example was prepared as follows.

5.03 g of a dye obtained by converting 3'-hydroxy-4'-bromoquinophthalone-5-carboxylic acid to a corresponding carboxyl chloride in a conventional manner in monochlorobenzene using thionyl chloride and condensing the chloride with m-aminophenol, 2.1 g of 2,4-difluoro-6-(diethylamino)triazine, 1.0 g of triethylamine, and 1.0 g of anhydrous potassium carbonate were added to 100 ml of acetone, and the resulting mixture was heated under reflux for 5 hours to conduct condensation reaction.

The thus obtained reaction solution was dropwise added to 1,000 ml of water, and the precipitate thus formed was collected by filtration, washed with water, and dried at room temperature to obtain 6.2 g (yield: 93%) of a yellow powdery dye represented by the above structural formula.

This dye had a λmax (acetone) of 445 nm.

EXAMPLE 2

A dye composition comprising 15 parts of a quinophthalone dye represented by the following structural formula:

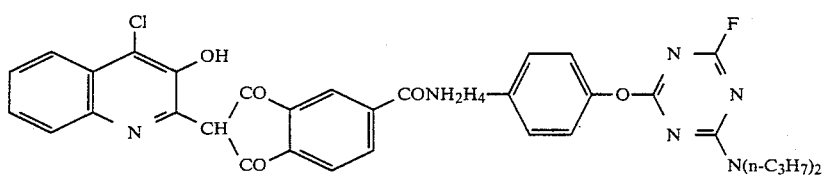

10 parts of a Pluronic type surfactant, Pluronic ®L64 (made by Asahi Electro-Chemical Co., Ltd.), and 75 parts of water was converted to a dye dispersion using a sand grinder as a finely dispersing machine. A printing color paste was prepared using this dye dispersion according to the following formulation:

|  | parts |
|---|---|
| Dye dispersion | 7 |
| 5% Sodium alginate aqueous solution | 55 |
| Polypropylene glycol diacetate (mean molecular weight: 300) | 10 |
| Polyethylene glycol diglycidyl ether (mean molecular weight: 200) | 3 |
| Water | 25 |
|  | 100 (pH 6.5) |

This color paste was applied to mercerized cotton broad (counts of yarn: 40) using a screen printing machine, dried at 80° C. for 3 minutes, then treated with superheated steam at 185° C. for 7 minutes.

Subsequent washing procedure was conducted according to the process described in Example 1 to obtain a yellow-dyed product having excellent light fastness and wet fastness.

The dye used in this Example was prepared as follows.

3'-Hydroxy-4'-chloroquinophthalone-5-carboxyl chloride prepared from 3'-hydroxy-4'-chloroquinophthalone-5-carboxylic acid in a conventional manner was condensed with p-(2-aminoethyl)phenol, and the resulting dye was then reacted with 2,4-difluoro-6-[di(n-propyl)amino]triazine in N-methyl-2-pyrrolidone using triethylamine as an acid-binding agent to obtain the dye used in this Example.

This product had a λmax (acetone) of 446 nm.

EXAMPLE 3

A dye composition comprising 10 parts of a quinophthalone dye represented by the following structural formula:

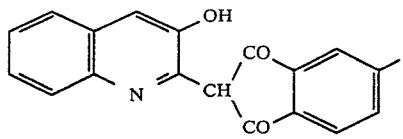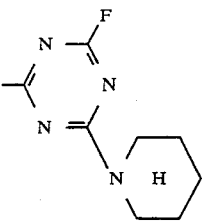

2 parts of polyoxyethylene glycol nonylphenyl ether (HLB: 8.9), and 88 parts of diethylene glycol diacetate was ground using a paint conditioner as a finely dispersing machine to prepare a dye ink.

10 parts of this dye ink was mixed with 55 parts of mineral turpentine, and the resulting mixture was gradually poured into 35 parts of an aqueous solution of the following formulation under stirring by a homomixer (5,000 to 7,000 rpm) and the stirring was continued till the mixture became uniform. Thus, a viscous o/w emulsion color paste was prepared.

|  | parts |
|---|---|
| Water | 31 |
| Lepitol-G (trade name of special nonionic surfactant; made by Dai-ichi Kogyo Seiyaku Co., Ltd.) | 3.8 |
| Sodium trichloroacetate | 0.1 |
|  | 34.9 |

Then, this color paste was applied to a polyester/cotton blended fabric (blending ratio: 65/35) using a screen printing machine, dried at 100° C. for 2 minutes, then treated with superheated steam at 185° C. The fabric was then washed with a hot tetrachloroethylene bath containing a small amount of water, and dried to obtain a yellow-dyed product having excellent light fastness and wet fastness and having no background staining properties.

The dye used in this Example was prepared as follows.

3'-Hydroxy-quinophthalone-5'-carboxy chloride prepared in a conventional manner from 3'-hydroxyquinophthalone-5'-carboxylic acid was condensed with p-aminothiophenol, and the resulting dye was then reacted with 2,4-difluoro-6-piperidinotriazine according to the process described in Example 1 to obtain the dye used in this Example.

EXAMPLE 4

A dye composition comprising 16 parts of a quinophthalone dye represented by the following structural formula:

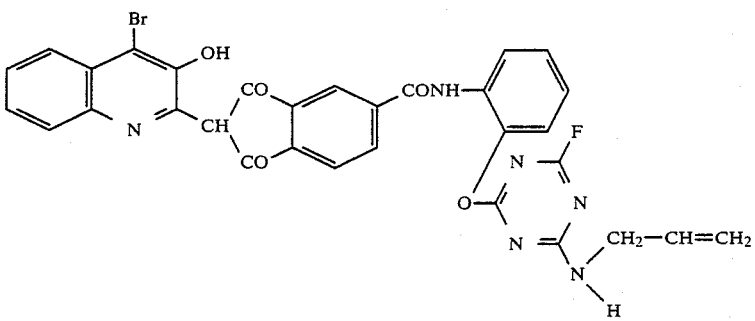

7 parts of polyoxyethylene glycol nonylphenyl ether (HLB: 13.3), 3 parts of a naphthalenesulfonic acidformaldehyde condensate, and 74 parts of water was converted to a dye dispersion by finely dispersing in a sand grinder. A pad bath of the following formulation was prepared using the dye dispersion:

|  | parts |
|---|---|
| Dye dispersion | 6 |
| Tetraethylene glycol dimethyl ether | 15 |
| Water | 79 |
|  | 100 (pH 8.0) |

A polyester/cotton blended fabric (blending ratio: 65/35) was impregnated with the bath and, after squeezing 45%, dried at 100° C. for 2 minutes, and dry-heated at 200° C. for 1 minute to fix. After washing the fabric in a hot ethanol solution, there was obtained a yellow-dyed product with excellent light fastness and wet fastness.

The dye used in this Example was prepared according to the process described in Example 1.

This product had a λmax (acetone) of 445 nm.

EXAMPLE 5

When printing was conducted in the same manner as in Example 1 except for changing the fabric to a nylon/rayon blended fabric (blending ratio: 50/50) and dry-heating temperature to 185° C., there was obtained a yellow-printed product with good wet fastness and light fastness.

EXAMPLE 6

Printing was conducted in the same manner as in Example 1 using quinophthalone dyes given in following Tables 1 to 7.

The resulting dyed products had good light fastness and wet fastness.

The hue on fabric or cloth and λmax (acetone) of each dye are tabulated in Tables 1 to 7.

TABLE 1

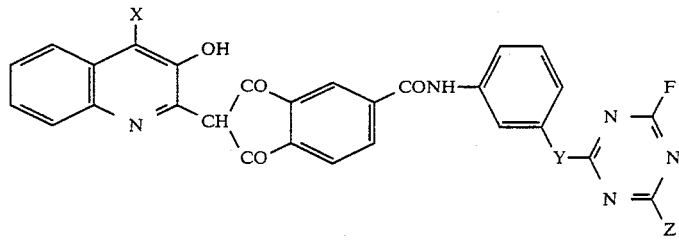

| No. | —X— | —Y— | —Z | Hue of Dyed Fabric | λmax (acetone) (nm) |
|---|---|---|---|---|---|
| 1 | —H | —O— | —N(C$_2$H$_5$)(C$_2$H$_4$N(C$_2$H$_5$)$_2$) | Yellow | 439 |
| 2 | " | " | —NH$_2$ | " | " |
| 3 | " | " | —N(CH$_3$)(C$_2$H$_4$OH) | " | " |
| 4 | " | " | —N⟨ ⟩H (piperidino) | " | " |
| 5 | " | —S— | —NHC$_{14}$H$_{29}$(sec) | " | 440 |
| 6 | —Cl | —O— | —N(C$_2$H$_4$OH)(CH$_2$—CH=CH$_2$) | " | 446 |
| 7 | " | " | —NHC$_2$H$_4$ | " | " |
| 8 | " | " | —N(C$_2$H$_4$OCH$_3$)$_2$ | " | " |
| 9 | " | —S— | —N(C$_2$H$_4$OH)$_2$ | " | 447 |
| 10 | —Br | —O— | —N(C$_2$H$_4$OCH$_3$)(C$_2$H$_4$CN) | " | 445 |
| 11 | " | " | —N⟨ ⟩H N—C$_2$H$_4$OH (piperazino) | " | " |
| 12 | " | " | —NH(CH$_2$)$_8$CH=CH(CH$_2$)$_7$CH$_3$ | " | " |
| 13 | " | " | —N[C$_6$H$_{13}$(n)]$_2$ | " | " |
| 14 | " | —S— | —N(CH$_2$—CH=CH$_2$)$_2$ | " | 446 |
| 15 | " | " | —N(C$_2$H$_4$OC$_2$H$_4$OCH$_3$)$_2$ | " | " |

TABLE 2

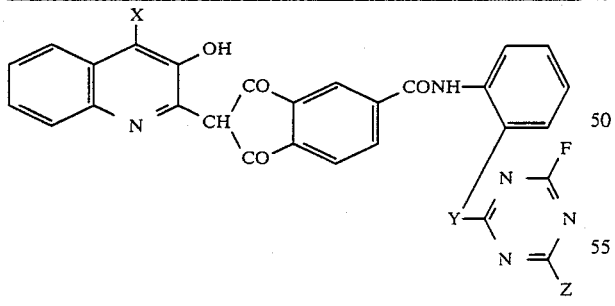

| No. | —X— | —Y— | —Z | Hue of Dyed Fabric | λmax (acetone) (nm) |
|---|---|---|---|---|---|
| 16 | —H | —O— | —NH—CH(CH₃)=CH—OH (−N(H)CH=C(CH₃)—CH=CH—OH) | Yellow | 439 |
| 17 | " | —S— | −N(2,5-dimethylpyrrolidinyl) | " | " |
| 18 | —Cl | —O— | —N(CH₃)₂ | " | 446 |
| 19 | " | " | —NHC₃H₇(i) | " | " |
| 20 | " | —S— | −N(morpholinyl) | " | 447 |
| 21 | —Br | —O— | —N[CH₂CH₂N(CH₃)₂]₂ | " | 446 |
| 22 | " | " | —NHCH₂CH(OH)—CH₃ | " | " |
| 23 | " | " | —N(pyrrolidinyl) | " | " |

TABLE 3

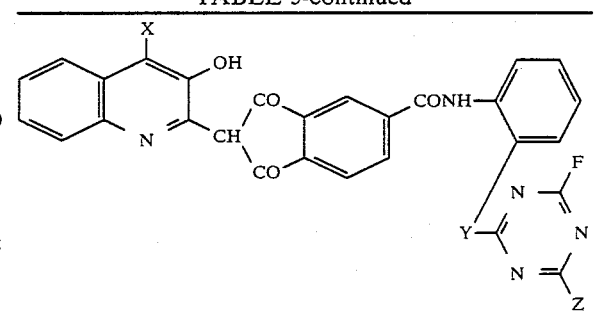

| No. | —X— | —Y— | —Z | Hue of Dyed Fabric | λmax (acetone) (nm) |
|---|---|---|---|---|---|
| 24 | —H | —O— | —N[C₉H₁₉(n)]₂ | Yellow | 439 |
| 25 | —Cl | " | —NHC₅H₁₁(n) | " | 446 |
| 26 | " | " | —N(CH₃)C₃H₆N(CH₃)₂ | " | " |
| 27 | —Br | " | −N(4-ethylpiperazinyl) | " | 445 |
| 28 | " | " | —N(C₂H₄CN)₂ | " | " |

TABLE 3-continued

Structure: quinoline-based with X, OH on quinoline; CH linked to benzodioxole-CO-NH-phenyl with Y-triazine(F, Z) substituent on phenyl ortho position.

| No. | —X— | —Y— | —Z | Hue of Dyed Fabric | λmax (acetone) (nm) |
|---|---|---|---|---|---|
| 29 | " | " | —N(C$_2$H$_4$OCH$_3$)(C$_2$H$_4$CN) | " | " |
| 30 | " | " | —N(CH$_3$)(C$_2$H$_4$OC$_2$H$_4$OCH$_3$) | " | " |
| 31 | " | —S— | —N(CH$_2$CH$_2$CH$_2$CN)$_2$ | " | " |

TABLE 4

Structure: quinoline-based with X, OH; CH linked to benzodioxole-CO-NH-CH$_2$-phenyl-Y-triazine(F, Z).

| No. | —X | —Y— | —Z | Hue of Dyed Fabric | λmax (acetone) (nm) |
|---|---|---|---|---|---|
| 32 | —H | —O— | —N(C$_2$H$_5$)$_2$ | Yellow | 439 |
| 33 | —Cl | " | —N(H)(C$_7$H$_{15}$(n)) | " | 446 |
| 34 | —Br | " | —N(C$_4$H$_9$)(sec) | " | 445 |
| 35 | " | " | —N(piperazine)N—C$_2$H$_4$OH | " | " |
| 36 | " | " | —N(3-methylpiperidine)H | " | " |

TABLE 5

Structure: quinoline-based with X, OH; CH linked to benzodioxole-CO-NHC$_2$H$_4$-phenyl-Y-triazine(F, Z).

| No. | —X | —Y— | —Z | Hue of Dyed Fabric | λmax (acetone) (nm) |
|---|---|---|---|---|---|
| 37 | —H | —O— | —N(H)(CH$_3$) | Yellow | 439 |
| 38 | —Cl | " | —N[C$_3$H$_7$(i)]$_2$ | " | 446 |
| 39 | —Br | " | —N(CH$_3$)((CH$_2$)$_8$CH=CH(CH$_2$)$_7$CH$_3$) | " | 445 |
| 40 | " | " | —N(azepane)H | " | " |

TABLE 6

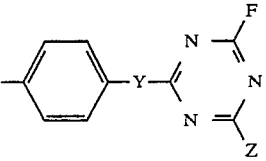

| No. | —X— | —Y— | —Z | Hue of Dyed Fabric | λmax (acetone) (nm) |
|---|---|---|---|---|---|
| 41 | —H | —O— | —N(H)(C$_{14}$H$_{29}$(n)) | Yellow | 439 |
| 42 | —Cl | " | —N(H)(C$_{18}$H$_{37}$(n)) | " | 446 |
| 43 | " | " | —N(C$_3$H$_6$OC$_3$H$_6$OC$_3$H$_7$)$_2$ | " | " |
| 44 | —Br | " | —N(C$_3$H$_6$OH)$_2$ | " | 445 |
| 45 | " | " | —N(CH$_3$)$_2$ | " | " |

TABLE 7

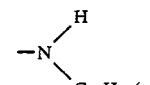

| No. | —X— | —Y— | —Z | Hue of Dyed Fabric | λmax (acetone) (nm) |
|---|---|---|---|---|---|
| 46 | —H | —O— | —N[C$_5$H$_{11}$(i)]$_2$ | Yellow | 439 |
| 47 | —Cl | " | —N(C$_2$H$_4$OH)$_2$ | " | 446 |
| 48 | —Br | " | —NH$_2$ | " | 445 |

COMPARATIVE EXAMPLE 1

Experiments of comparing the dye of the present invention with a conventional dye were conducted as follows.

Dyes Used

Structural formula of the dye of the present invention used here and that of a conventional dye are shown in Table 8.

Additionally, the conventional dye is a dye described in Japanese Patent Application (OPI) No. 151064/80 (the term "OPI" as used herein refers to a "published unexamined Japanese patent application").

Experiments (A) Light-Fastness:
Measuring Method:
Each of the dyes was used in the same manner as in Example 1, and light fastness of each of the dyed fabrics was measured.

Results are shown in Table 8.

(B) Cotton-Staining Fastness:
This fastness relates to staining properties of the dyed fabric onto a white material. Excellent cotton-staining fastness means that the printed fabric does not stain a white material in contact with it, thus the printed fabric having high quality.

Measuring Method:
A printing color paste was prepared according to Example 1 using each of the above-described dyes, applied to a polyester/cotton blended fabric (blending ratio: 65/35) using a screen printing machine, dried at 80° C. for 3 minutes, then dry-heated at 215° C. for 90 seconds to fix. A cotton fabric of the same area was applied to the printed fabric, and immediately treated in a washing solution containing 2 g/liter of Na$_2$CO$_3$ and 2 g/liter of Scourol #900 (bath ratio: 1:200) at 80° C. for 15 minutes to measure the degree of stain on the cotton fabric.

Results are shown in Table 8.

TABLE 8

| Dye | Structural Formula | Light Fastness (grade) | Cotton-Staining Fastness (grade) |
|---|---|---|---|
| Dye of the invention | 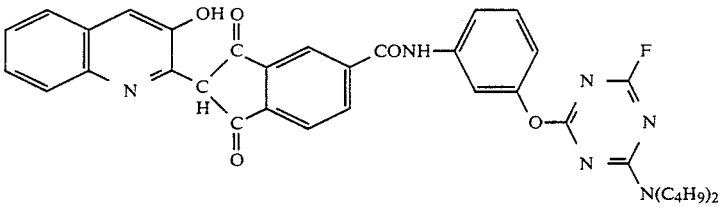 | 5–6 | 5 |
| Conventional dye | 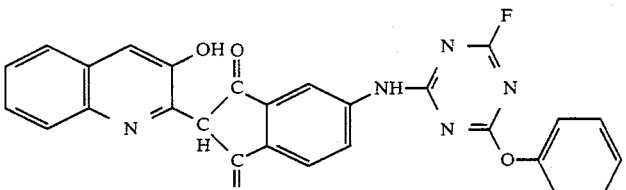 | 4 | 3–4 |

While the invention has been described in detail and with reference to specific embodiments thereof, it will be apparent to one skilled in the art that various changes and modifications can be made therein without departing from the spirit and scope thereof.

What is claimed is:

1. A quinophthalone dye for cellulose-containing fibers represented by the following formula:

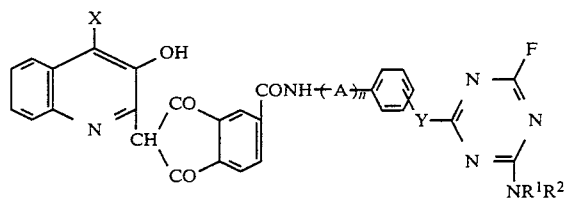

wherein X represents a hydrogen atom, a chlorine atom or a bromine atom, —A— represents a methylene group, an ethylene group, a propylene group or a 1,3-butylene group, n represents 0 or 1, —Y— represents a linkage group of —O— or —S—, $R^1$ and $R^2$ each represents a hydrogen atom, an alkyl or alkenyl group which may optionally be substituted with a cyano group, a hydroxy group, a lower alkoxy group or by a dialkylamino group, or $R^1$ and $R^2$ may be combined together with the adjacent nitrogen atom to form a 5- or 6-membered, nitrogen-containing heterocyclic ring having the total carbon atom number in $R^1$ and $R^2$ of up to 18.

2. The quinophthalone dye described in claim 1, wherein the nitrogen-containing heterocyclic ring formed by $R^1$ and $R^2$ and the adjacent nitrogen atom is selected from the group consisting of 1-pyrrolidinyl, 3-methyl-1-pyrrolidinyl, 2-hydroxy-1-pyrrolidinyl, 2,5-dimethyl-1-pyrrolidinyl, 3-thiazolidinyl, 1-pyrrolyl, 1-pyrazolyl, 1-imidazolyl, morpholino, piperidino, 2,6-dimethylpiperidino, 1-piperazinyl, and 4-methyl-1-piperazinyl.

3. The quinophthalone dye described in claim 1, wherein —NR, $R^2$ is a disubstituted amino group containing 6 to 12 carbon atoms.

* * * * *